United States Patent
Trabold et al.

(10) Patent No.: US 7,901,832 B2
(45) Date of Patent: Mar. 8, 2011

(54) BIPOLAR PLATE WITH INLET AND OUTLET WATER MANAGEMENT FEATURES

(75) Inventors: Thomas A. Trabold, Pittsford, NY (US); Jon P. Owejan, Honeoye, NY (US); Steven J. Spencer, Rochester, NY (US); Jeffrey A. Rock, Fairport, NY (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 12/119,956

(22) Filed: May 13, 2008

(65) Prior Publication Data

US 2009/0286133 A1 Nov. 19, 2009

(51) Int. Cl.
*H01M 8/00* (2006.01)
*H01M 8/06* (2006.01)
*H01M 8/04* (2006.01)
*H01M 4/64* (2006.01)

(52) U.S. Cl. .......... 429/512; 429/400; 429/413; 429/518

(58) Field of Classification Search ............. 429/12–46, 429/456, 457
See application file for complete search history.

(56) References Cited

U.S. PATENT DOCUMENTS

| 6,376,110 | B1 * | 4/2002 | Koschany ........................ 429/13 |
| 6,406,807 | B1 * | 6/2002 | Nelson et al. .................... 429/13 |
| 6,921,598 | B2 * | 7/2005 | Yamamoto et al. ............. 429/34 |
| 2004/0106034 | A1 * | 6/2004 | Bekkedahl et al. ............. 429/44 |
| 2005/0008925 | A1 * | 1/2005 | Hu ................... 429/38 |
| 2006/0105227 | A1 * | 5/2006 | Kim et al. ........................ 429/44 |
| 2006/0216570 | A1 | 9/2006 | Vyas et al. |
| 2007/0037036 | A1 | 2/2007 | Winter et al. |

FOREIGN PATENT DOCUMENTS

WO WO 2007/021676 A2 2/2007

* cited by examiner

*Primary Examiner* — Jennifer K Michener
*Assistant Examiner* — Eli S Mekhlin
(74) *Attorney, Agent, or Firm* — Fraser Clemens Martin & Miller LLC; J. Douglas Miller

(57) ABSTRACT

A fuel cell assembly is disclosed that utilizes a fuel cell plate having hydrophobic portions adjacent an inlet and an outlet formed therein, and a hydrophilic portion formed in the flow channels of the fuel cell plate adjacent the hydrophobic portions, wherein the hydrophilic portion and the hydrophobic portion facilitate the transport of liquid water from the fuel cell plate.

20 Claims, 4 Drawing Sheets

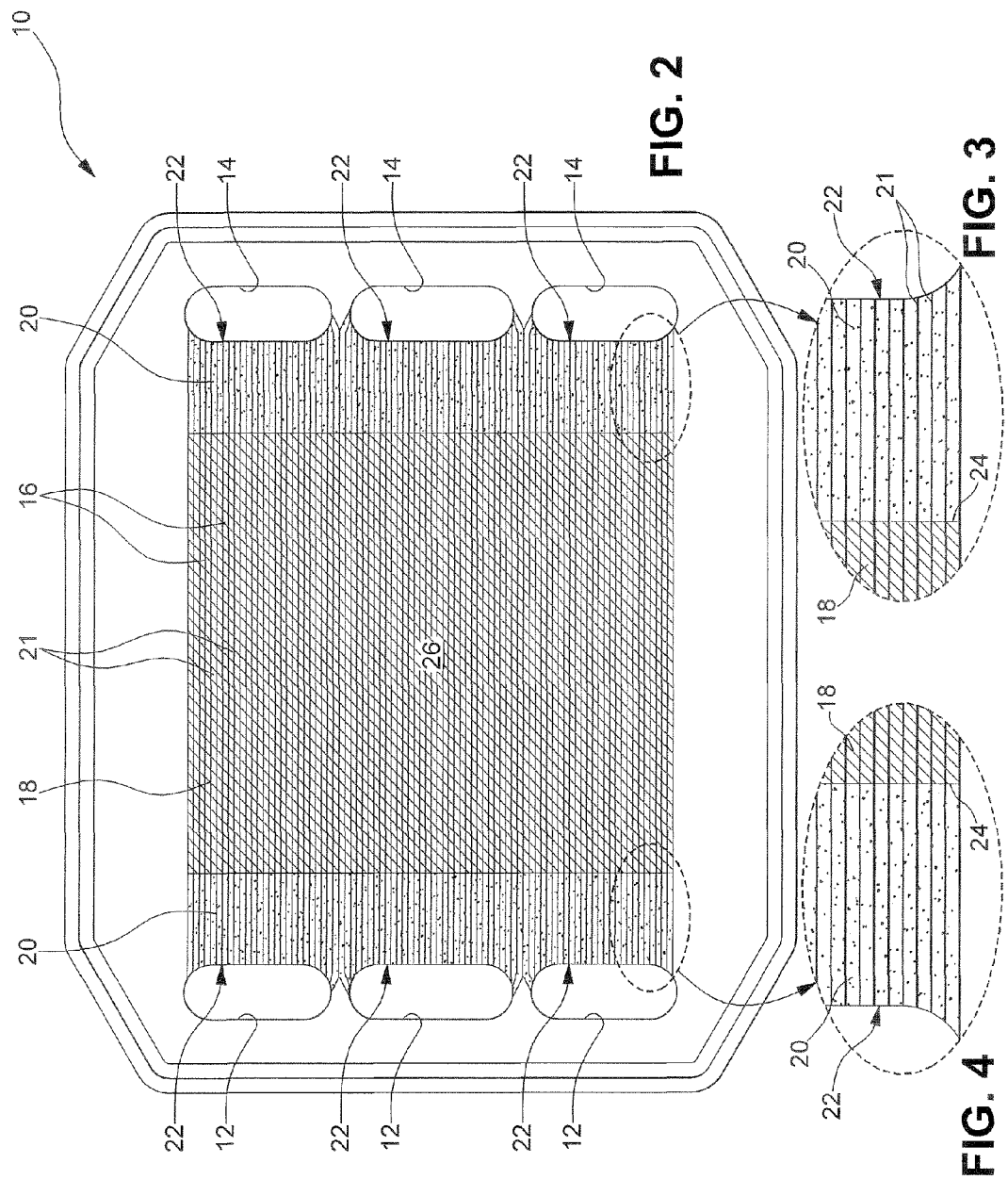

BIPOLAR PLATE WITH INLET AND OUTLET WATER MANAGEMENT FEATURES

FIELD OF THE INVENTION

The invention relates to a fuel cell plate, and more particularly to a fuel cell plate having a hydrophobic portion adjacent an outlet formed therein and a hydrophilic portion formed on the flow channels of the fuel cell plate adjacent the hydrophobic portion, wherein the hydrophilic portion and the hydrophobic portion facilitate the transport of liquid water from the fuel cell plate. In addition, a hydrophobic portion adjacent an inlet formed therein prevents liquid water from entering the fuel cell plate.

BACKGROUND OF THE INVENTION

Fuel cell power systems convert a fuel and an oxidant to electricity. One type of fuel cell power system employs use of a proton exchange membrane (hereinafter "PEM") to catalytically facilitate reaction of the fuel (such as hydrogen) and the oxidant (such as air or oxygen) to generate electricity. The PEM is a solid polymer electrolyte that facilitates transfer of protons from the anode to the cathode in each individual fuel cell of a stack of fuel cells normally deployed in a fuel cell power system.

In a typical fuel cell stack of the fuel cell power system, individual fuel cells provide channels through which various reactants and cooling fluids flow. Movement of water from the channels to outlet manifolds of the fuel cell plates is caused by the flow of the reactants through the fuel cell assembly. Drag forces pull the liquid water through the channels until the liquid water exits the fuel cell through the outlet manifold. However, when the fuel cell is operating at a lower power output, the velocity of the gas flow is too low to produce an effective drag force to transport the liquid water, and the liquid water accumulates in the flow channels.

A further limitation of utilizing gas flow drag forces to remove the liquid water is that the water may encounter various surface irregularities with high or low surface energy or the water may encounter pinning points on the flow channel surfaces. Because the drag forces may not be strong enough to effectively transport the liquid water, the pinning points may cause the water to accumulate and pool, thereby stopping the water flow. Such pinning points are those commonly located where channel inlets and channel outlets meet the fuel cell assembly manifold.

At the outlet aperture of each fuel cell plate, water must overcome a pinning force on the edge thereof. Moreover, for a hydrophilic surface, there is a capillary force that acts in the direction of a lower radius of curvature of the interface of the liquid water and water vapor. Liquid water and water vapor tend to flow from a region that produces a water vapor gas/liquid water interface having a radius of curvature, such as manifolds, for example, to a region producing a gas/liquid interface having a smaller radius of curvature, such as the flow channels, for example. The radius of curvature of the gas/liquid interface will vary based on the size of the region in which the interface is formed. For example, as the width, or other dimension, of the region increases, the radius of curvature of the interface will also increase. The capillary force is represented by the equation:

$$\Delta P = P_{nonwetting} - P_{wetting} = [(2\sigma)/R]*\cos\theta$$

Where:

$P_{nonwetting}$=pressure in gas (air or hydrogen) phase
$P_{wetting}$=pressure in liquid (water) phase
$\sigma$=liquid surface tension
$\theta$=static contact angle
$R$=radius of curvature of gas-liquid interface For a fuel cell bipolar plate with hydrophilic surface (i.e., $\theta<90°$), residual water may be pulled from the outlet manifold and into the flow channels in the absence of reactant gas flow. Additionally, in cold operating conditions, condensation may form in the inlet manifold upstream from the inlet apertures of each fuel cell plate. The flow of reactant gas and capillary forces may cause the condensation to flow from the inlet manifold into the flow channels. To remove the accumulated water, the flow rate of the reactants through the fuel cell assembly or pressure drop across each fuel cell plate may be increased. However, increasing the flow rate or pressure drop decreases the efficiency of the fuel cell system.

Furthermore, the water accumulated on the fuel cell plates may form ice in the fuel cell assembly. The presence of water and ice may affect the performance of the fuel cell assembly. During typical operation of the fuel cell assembly, waste heat from the fuel cell reaction heats the assembly and militates against vapor condensation and ice formation in the assembly. During a starting operation or low power operation of the fuel cell assembly in freezing temperatures, the condensed water in the flow channels of the fuel cell plates and at edges of the outlet manifolds may form ice within the fuel cell assembly. The ice formation may restrict reactant flow, resulting in a voltage loss and inefficient operation of the fuel cell system.

To further facilitate the removal of water, some fuel cell assemblies utilize plates having hydrophilic coatings or hydrophilic structures such as a foam, a wick, or a mesh. Water has been observed to form a film on the surface of the hydrophilic material. The film tends to accumulate at the outlet of the flow channels and the perimeter of the plates. The water film can block the gas flow, which in turn reduces the driving force for removing liquid water and thus militates against the removal of the liquid water from the fuel cell assembly. In the case of a fuel cell plate with a mildly hydrophobic surface, water has been observed to form large drops that protrude into the fuel cell assembly outlet manifold blocking the exits of the channels of the fuel cell plates. The droplets are observed to remain at the plate edge until they can be intermittently removed by gas shear. The accumulation of water can cause gas flow blockages or flow imbalances that may cause the fuel cell assembly to operate inefficiently. Fuel cell plates having a hydrophilic coating may be expensive to produce. Typically, the hydrophilic coating is disposed on the fuel cell plate using vacuum methods such as the plasma enhanced chemical vapor deposition (PECVD) method, the sol-gel method, and the atomic layer deposition (ALD) method. The use of the hydrophilic foam, the hydrophilic wick, or the hydrophilic mesh increases the material costs, assembly costs, and assembly time of the fuel cell assembly.

It would be desirable to develop a fuel cell plate for a fuel cell assembly with an improved means for removing liquid water from the flow channels of the fuel cell plate to minimize the accumulation of liquid water within the fuel cell assembly.

Concordant and congruous with the present invention, a fuel cell plate for a fuel cell assembly with an improved means for removing liquid water from the flow channels of the fuel cell plate to minimize the accumulation of liquid water within the fuel cell assembly has been discovered.

In one embodiment, a fuel cell plate comprises a plate having an inlet aperture and an outlet aperture formed therein and a plurality of flow channels formed between and in fluid communication with the inlet aperture and the outlet aperture;

a hydrophobic portion formed on the flow channels adjacent the outlet aperture; and a hydrophilic portion formed on the flow channels adjacent said hydrophobic portion and forming an interface therebetween, wherein said hydrophobic portion and said hydrophilic portion facilitate a transport of water from the flow channels to the outlet aperture.

In another embodiment, the fuel cell plate comprises a plate having an inlet aperture and an outlet aperture formed therein and a plurality of flow channels formed between and in fluid communication with the inlet aperture and the outlet aperture; a hydrophobic portion formed on at least a portion of the flow channels adjacent the inlet aperture and the outlet aperture; and a hydrophilic portion formed on the flow channels adjacent the hydrophobic portion and forming an interface therebetween, wherein the hydrophobic portion and the hydrophilic portion facilitate a transport of water away from the flow channels.

In another embodiment, the fuel cell stack comprises a plurality of fuel cell plates, each of said plates having an inlet aperture and an outlet aperture formed therein and a plurality of flow channels formed between and in fluid communication with the inlet aperture and the outlet aperture; a hydrophobic portion formed on the flow channels adjacent at least the outlet aperture and the inlet aperture; and a hydrophilic portion formed on the flow channels adjacent said hydrophobic portion and forming an interface therebetween, wherein said hydrophobic portion and said hydrophilic portion facilitate a transport of water from the flow channels to the outlet aperture.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a top plan view of a fuel cell plate including a hydrophilic portion adjacent to a hydrophobic portion according to an embodiment of the invention;

FIG. 3 is an enlarged fragmentary top plan view of an outlet aperture of the fuel cell plate illustrated in FIG. 2;

FIG. 4 is an enlarged fragmentary top plan view of an inlet aperture of the fuel cell plate illustrated in FIG. 2;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
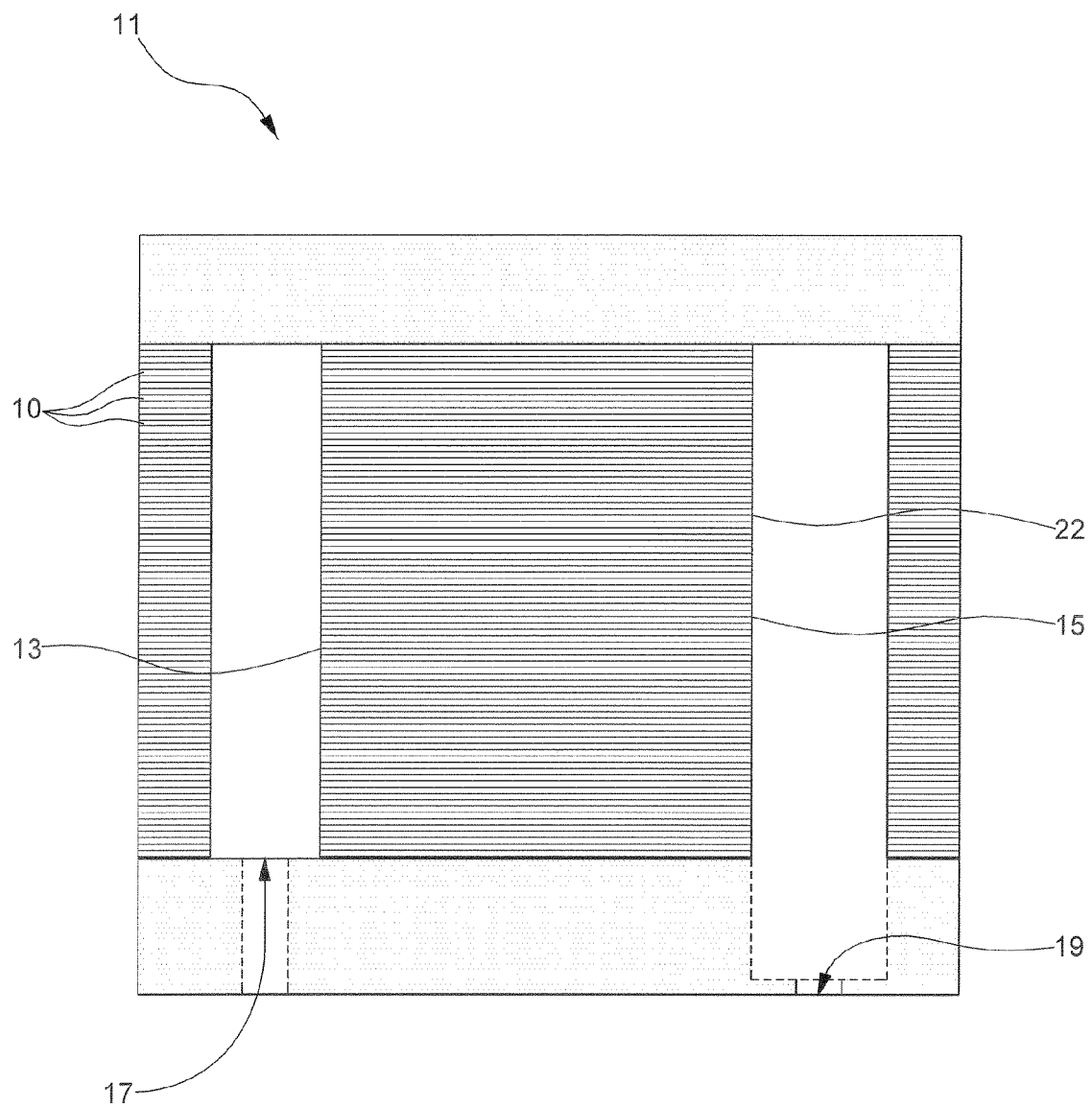
FIG. 1 is a cross-sectional elevational view of a fuel cell assembly including a plurality of fuel cell plates according to an embodiment of the invention.

FIG. 2 shows a top plan view of a bipolar fuel cell plate 10 formed from a pair of unipolar plates. The fuel cell plate 10 includes a plurality of inlet apertures 12, a plurality of outlet apertures 14, and a plurality of flow channels 16. The fuel cell plate 10 includes a hydrophilic portion 18 and a hydrophobic portion 20 formed thereon. As shown in FIG. 1, when a plurality of the fuel cell plates 10 are stacked in a fuel cell stack of a fuel cell assembly 11, the inlet apertures 12 of each of the fuel cell plates 10 cooperate to form an inlet manifold 13, and the outlet apertures 14 of each of the fuel plates 10 cooperate to form an outlet manifold 15. The inlet manifold 13 is in fluid communication with an inlet 17 of the fuel cell assembly 11 and the outlet manifold 15 is in fluid communication with an outlet 19 of the fuel cell assembly 11.

It is understood that the material of construction, size, shape, quantity, and type of plates 10 in the fuel cell assembly 11, and the configuration of the fuel cell plates 10 within the assembly 11, may vary based on design parameters such as the amount of electricity to be generated, the size of the machine to be powered by the fuel cell assembly 11, the volumetric flow rate of gases through the fuel cell assembly 11, and other similar factors, for example. The fuel cell plates 10 may be formed from any conventional material such as graphite, a carbon composite, or a stamped metal, for example. The fuel cell plate 10 shown in FIG. 2 may be used for an anode side or for a cathode side of the fuel cell assembly 11.

As shown in FIG. 2, the fuel cell plate 10 has three inlet apertures 12 and three outlet apertures 14. The inlet apertures 12 and the outlet apertures 14 are adapted to distribute reactant gases and a coolant through the fuel cell assembly 11. The fuel cell plate 10 may have any number of inlet apertures 12 and outlet apertures 14 and any configuration of apertures 12, 14, as desired. The reactant flow channels 16 are formed on an external face of the fuel cell plate 10 with lands 21 formed between adjacent flow channels. However, the flow channels 16 may also be formed as passages intermediate internal faces of the fuel cell plate 10. As shown, the flow channels 16 and the lands 21 are substantially linear, but may be undulated, serpentine, or have other configurations, as desired. It is also understood that the flow channels 16 may be in communication with flow apertures formed through the face of the fuel cell plate 10 adjacent to and in communication with the apertures 12, 14, as desired. The flow apertures facilitate the use of a gasket disposed between adjacent fuel cell plates 10 by providing a path for fluid communication between the flow channels 16 and the apertures 12, 14 that circumvents the gasket.

The hydrophilic portion 18 is typically a coating formed from a hydrophilic material on the flow channels 16 of an active area 26 of the fuel cell plate 10. The hydrophilic portion 18 is formed adjacent the hydrophobic portions 20. It is understood that the hydrophilic material may be a silicon oxide ($SiO_x$), a titanium oxide, or another metal oxide. The hydrophilic material may be prepared by a sol-gel process, or other chemical method, as desired. It is also understood that the hydrophilic portion 18 may extend outside of the active area 26, as desired, and may be formed by other methods such as a surface treatment, for example. It is further understood that the hydrophilic portion 18 may be applied to either the anode or cathode side of bipolar plate 10. Alternatively, the hydrophilic portion 18 may be applied in a desired location to a bulk supply of metal sheet prior to a stamping operation to form the plate so that after the stamping operation and the joining of unipolar plates, the hydrophilic portion 18 is formed as shown in FIG. 2.

The hydrophobic portion 20 is typically a coating formed from a hydrophobic material. The hydrophobic portion is formed on the flow channels 16 intermediate the hydrophilic portion 18 and the outlet apertures 14. The hydrophobic portion 20 extends to an edge 22 of the fuel cell plate 10 adjacent the apertures 12, 14. The hydrophobic portion 20 substantially abuts the hydrophilic portion 18 defining an interface 24 therebetween. In the embodiment shown, the interface 24 is rectilinear, however, it is understood that the interface 24 may have a triangular shape, circular shape, linear shape, or other shape, as desired. It is understood that the hydrophobic coating may be a silane, silicone, alkylsilane, a fluoroalkylsilane, a polydimethylsiloxane, polytetrafluorothylene, a fluorocarbon prepared by sol-gel process or other chemical method, as desired. It is also understood that the hydrophobic portion 20 may extend into the active area 26, as desired, and may also be formed by other methods such as a surface treatment, for example.

To form the hydrophilic portion 18 and the hydrophobic portion 20 on the fuel cell plate 10, a number of processes may be utilized. In one process, the fuel cell plate 10 and inlet apertures 12 thereof may be dipped in a hydrophilic material up to a desired interface 24 adjacent the outlet apertures 14. The fuel cell plate 10 is then rotated 180° and dipped in a hydrophobic material up to the desired interface 24. In one embodiment, the hydrophobic portion 20 is formed adjacent to both the inlet apertures 12 and the outlet apertures 14. To facilitate this embodiment, appropriate masks could be applied to cover the inlet apertures 12 and the outlet apertures 14. The entire masked fuel cell plate 10 would then be dipped in the hydrophilic material. The masks could be removed, and the fuel cell plate 10 dipped in a hydrophobic material up to the desired interface 24 adjacent the outlet apertures 14. Thereafter, the plate 10 is rotated 180° and dipped in a hydrophobic material up to the desired interface 24 adjacent the inlet apertures 12. In addition to these embodiments, to facilitate hydrophilic-to-hydrophobic coating transitions 24, there may be a portion of the fuel cell plate 10 having no coating disposed between the hydrophilic portions 18 and the hydrophobic portions 20. Moreover, the hydrophilic portion 18 and the hydrophobic portion 20 may be overlapped to accommodate positioning tolerances.

Alternatively, the hydrophilic portion 18 may be formed on the fuel cell plate 10 by applying the hydrophilic material with a spraying or a brushing process. A plurality of fuel cell plates 10 is then stacked in the fuel cell assembly 11 and the fuel cell plates 10 are compressed. The hydrophobic material is then sprayed or otherwise caused to flow into the inlet manifold 13 and the outlet manifold 15 of the fuel cell assembly 11 to adhere to a portion of the fuel cell plates 10 adjacent the manifolds 13, 15 and form the hydrophobic portion 20 of each fuel cell plate 10. To maximize the area of the hydrophobic portion 20, the hydrophobic material may be caused to flow into the manifolds 13, 15 prior to the compression of the fuel cell plates 10.

The hydrophilic portion 18 may also be formed on the fuel cell plate 10 by applying the hydrophilic material with a chemical vapor deposition (CVD) process. The hydrophilic portion 18 is formed on the flow channels 16 of the active area 26 of the fuel cell plate 10. Appropriate masking is disposed on the fuel cell plate 10 to militate against the application of the hydrophilic material on the hydrophobic portion 20 of the fuel cell plate 10. The masking is then removed and the hydrophobic material is applied to the fuel cell plate 10 to form the hydrophobic portion 20. The interface 24 is formed where the hydrophilic portion 18 abuts the hydrophobic portion 20. For some CVD processes, it is possible to render a hydrophilic material hydrophobic or to render a hydrophobic material hydrophilic by applying a pure gas plasma after the deposition process. Accordingly, the entire fuel cell plate 10 may be coated with the hydrophobic material using the CVD process, and then desired portions of the fuel cell plate 10 may be rendered hydrophilic with the pure gas plasma to form the hydrophilic portion 18.

Also, the hydrophilic portion 18 may be formed on the fuel cell plate 10 by plasma polymerization using an atmospheric air plasma process. A feedstock of silicon oxide ($SiO_x$), a titanium oxide, or another metal oxide, typically in the form of a powder, liquid, or suspension, is introduced into an energized plasma plume and polymerized and applied to the fuel cell plate 10. The plasma plume is typically compressed air, but the plasma plume may be nitrogen, oxygen, or other inert gas, as desired. Alternatively, the fuel cell plate 10 may be coated with a silica precursor prior to treatment with the atmospheric air plasma plume. The energy from the plasma plume removes the organic contaminants from the precursor and polymerizes, thereby resulting in a silicon oxide hydrophilic portion 18 formed on the fuel cell plate 10. The silica precursor may be hexamethyl disiloxane (HMDSO), hexamethyl disilazane (HMDSN), tetra ethoxy silane (TEOS), or any other suitable silica precursor, as desired. The interaction of the precursor feedstock particles with the plasma plume and the fuel cell plate 10 may vary based on process parameters such as the feedstock type, plasma gas composition, plasma plume flow rate, the amount of energy input into the plasma plume, distance of the plasma source from the fuel cell plate 10, and the like. After the SiOx deposition, the fuel cell plate 10 may be subjected to a post-treatment process, wherein the SiOx coated fuel cell plate 10 is treated with an atmospheric air plasma to modify the SiOx with hydroxyl groups to obtain a desired hydrophilicity.

A fuel cell plate 10 having a hydrophilic portion 18 with the desired hydrophilic properties has been formed using the following exemplary process. The fuel cell plate 10 is treated with the energized plasma plume to remove organic materials therefrom. The plasma plume may be at a current in the range of 2.5 to 3 Amperes and 130 to 150 Volts. The fuel cell plate 10 is then dipped in or brushed with HMDSO and allowed to dry for two to five minutes. The HMDSO dipped fuel cell plate 10 is then treated with the energized atmospheric air plasma plume. The energy from the plasma plume removes the organic contaminants from the precursor, thereby resulting in a silicon oxide hydrophilic portion 18 formed on the fuel cell plate 10. The resulting hydrophilic portion 18 has a thickness between 0.1 to 1 microns. The plasma plume was emitted through a nozzle having a 2 mm diameter and moving at a rate of 10 mm/s over the surface of the fuel cell plate 10.

Generally, during operation of a fuel cell power system, a hydrogen reactant is fed into the anode side of the fuel cell assembly 11. Concurrently, an oxygen reactant is fed into the cathode side of the fuel cell assembly 11. On the anode side, the hydrogen is catalytically split into protons and electrons. The oxidation half-cell reaction is represented by: $H_2 \leftrightarrow 2H^+ + 2e^-$. In a polymer electrolyte membrane fuel cell, the protons permeate through the membrane to the cathode side. The electrons travel along an external load circuit to the cathode side creating the current of electricity of the fuel cell assembly 11. On the cathode side, the oxygen reacts with the protons permeating through the membrane and the electrons from the external circuit to form water molecules. This reduction half-cell reaction is represented by: $4H^+ + 4e^- + O_2 \leftrightarrow 2H_2O$. Anode exhaust from the anode side flows through a backpressure control valve to a combustor, or is alternatively recycled back to the anode inlet manifold 13. Cathode exhaust from the cathode side flows through a second backpressure control valve to the combustor or to the ambient environment. A control module typically regulates the conditions of the hydrogen stream, oxygen stream, and exhaust streams by operating various control valves, backpressure control valves, and compressors in response to signals from pressure sensors and electrical power sensors connected to the fuel cell assembly 11.

During operation of the fuel cell assembly 11, droplets of liquid water are formed in the flow channels 16 of the fuel cell plates 10 on the cathode sides of the fuel cell assembly 11. Some water also may be transported into the anode flow channels, or may form in the anode channels via condensation resulting from consumption of the hydrogen. It is understood that the operation as described herein for the cathode side is similar to operation for the anode side of the fuel cell assembly 11. Once the water contacts the hydrophilic portion 18, the water is spread across the hydrophilic portion 18 to militate against water slug formation. The air stream flowing through the cathode side causes the water droplets to flow through the flow channels 16, toward the outlet manifold 15. Water vapor also flows towards the outlet manifold 15.

A capillary force acts in the direction from the manifolds 13, 15 to the flow channels 16 because the capillary force tends to flow from a region having a width that produces a water vapor gas/liquid water interface having a radius of curvature, such as the manifolds 13, 15, to a region having a narrower width producing a gas/liquid interface having a smaller radius of curvature, such as the flow channels 16, for example. However, in the presence of the hydrophobic portion 20, once the liquid water and water vapor are forced through the hydrophobic portion 20 and into the outlet manifold 15, the hydrophobic portion 20 militates against the flow of water from the outlet manifold 15 into the flow channels 16. The hydrophobic portion 20 formed adjacent the inlet manifold 13 also militates against the flow of water therefrom and into the flow channels 16. Because the reactant flow through the inlet manifold 13 typically has a relative humidity less than one-hundred percent, water that has accumulated in the inlet manifold 13 will be evaporated during operation of the fuel cell assembly 11.

Figure 5:
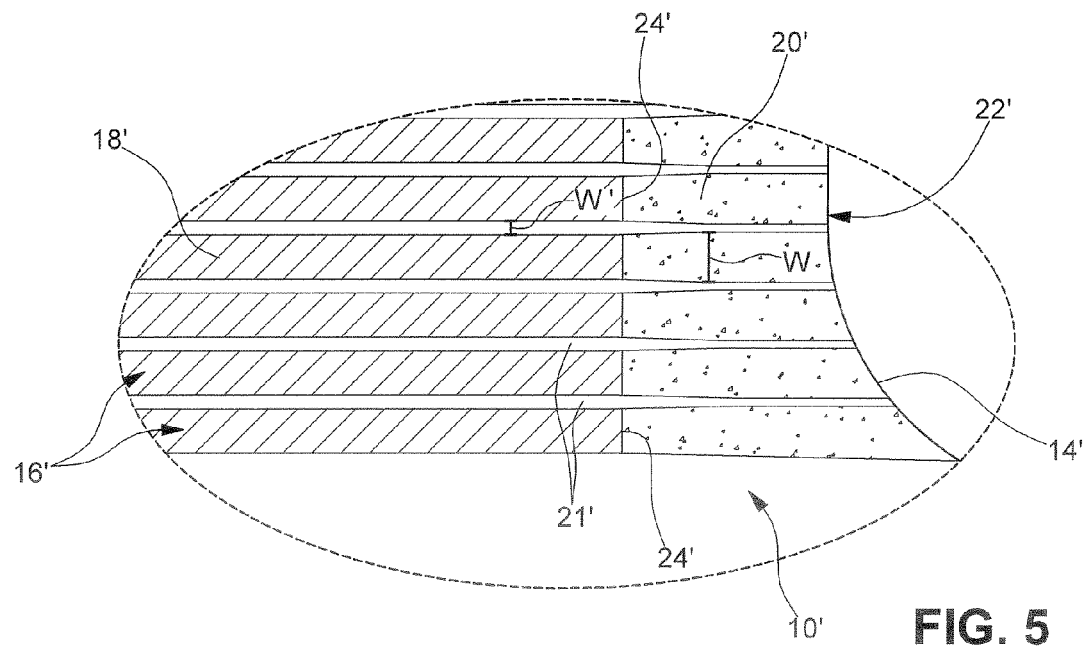
FIG. 5 is an enlarged fragmentary top plan view of an outlet aperture of a fuel cell plate according to another embodiment of the invention.

FIG. 5 shows a fuel cell plate 10' according to an embodiment of the invention similar to the fuel cell plate 10 of FIG. 2 except as described below. Like structure repeated from FIG. 2, in FIG. 5 includes the same reference numerals and a prime symbol ('). The fuel cell plate 10' includes a hydrophilic portion 18' and a hydrophobic portion 20' formed thereon. The hydrophobic portion 20' is adjacent to and in fluid communication with an outlet aperture 14'.

Similar to the fuel cell plate 10, the fuel cell plate 10' has flow channels 16' formed on an external face thereof. Lands 21' are formed between adjacent flow channels 16'. The flow channels 16' may also be formed as passages intermediate internal faces of the fuel cell plate 10'.

The hydrophilic portion 18' is typically a coating formed from a hydrophilic material on the flow channels 16' of an active area of the fuel cell plate 10'. The hydrophilic portion 18' is formed adjacent the hydrophobic portions 20'. The flow channels 16' of the hydrophilic portion 18' and the lands 21' formed therebetween have a substantially uniform width. The hydrophilic material may be a silicon oxide ($SiO_x$), a titanium oxide, or another metal oxide. The hydrophilic material may be prepared by a sol-gel process or other chemical method, as desired. It is also understood that the hydrophilic portion 18' may extend outside of the active area, as desired, and may be formed by other methods such as a surface treatment, for example.

The hydrophobic portion 20' is typically a coating formed from a hydrophobic material. The hydrophobic portion is formed on the flow channels 16' intermediate the hydrophilic portion 18' and the outlet apertures 14'. Each of the flow channels 16' of the hydrophobic portion 20' has at least a portion having a width W greater than the width of the hydrophilic portion 18' of the flow channels 16'. In the embodiment shown, the width W progressively increases in the direction of the outlet aperture 14', while the lands 21' formed between the flow channels 16' of the hydrophobic portion 20' have a progressively decreasing width W' in the direction of the outlet aperture 14'. It is understood that the width W of the flow channels 16' of the hydrophobic portion 20' may be uniform, as desired. The hydrophobic portion 20' extends to an edge 22' of the fuel cell plate 10' adjacent the outlet aperture 14'. The hydrophobic portion 20' substantially abuts the hydrophilic portion 18' defining an interface 24' therebetween. In the embodiment shown, the interface 24' is rectilinear, however, it is understood that the interface 24' may have a triangular shape, circular shape, linear shape, or other shape, as desired. It is also understood that the location at which the channel width W begins to increase may be coincident with the interface 24 between the hydrophilic portion 18 and hydrophobic portion 20 of the plate. It is further understood that the hydrophobic coating may be a silane, silicone, alkylsilane, a fluoroalkylsilane, a polydimethylsiloxane, polytetrafluoroethylene, or a fluorocarbon prepared by a sol-gel, or other chemical coating, as desired. It is also understood that the hydrophobic portion 20' may extend into the active area, as desired, and may be formed by other methods such as a surface treatment, for example.

During operation of a fuel cell assembly, droplets of liquid water are formed in the flow channels 16' of the fuel cell plates 10' on the cathode sides of the fuel cell assembly. Some water also may be transported into the anode flow channels, or may form in the anode channels via condensation resulting from consumption of the hydrogen. It is understood that the operation as described herein for the cathode side is similar to operation for the anode side of the fuel cell assembly. Once the water contacts the hydrophilic portion 18', the water is spread across the hydrophilic portion 18' to militate against water slug formation. The air stream flowing through the cathode side causes the water droplets to flow through the flow channels 16' of the active area, toward an outlet manifold of the fuel cell assembly. Water vapor also flows towards the outlet manifold.

A capillary force acts in the direction from the manifolds to the flow channels 16' because the capillary force tends to flow from a region having a width that produces a water vapor gas/liquid water interface having a radius of curvature, such as the manifolds, to a region having a narrower width producing a gas/liquid interface having a smaller radius of curvature, such as the flow channels 16', for example. However, in the presence of the hydrophobic portion 20', once the liquid water and water vapor are forced through the hydrophobic portion 20' and into the outlet manifold, the hydrophobic portion 20' militates against the flow of water from the outlet manifold into the flow channels 16'. The hydrophobic portion 20' formed adjacent an inlet manifold also militates against the flow of water therefrom and into the flow channels 16'. Because the reactant flow through the inlet manifold typically has a relative humidity less than one-hundred percent, water that has accumulated in the inlet manifold will be evaporated during operation of the fuel cell assembly.

Figure 6:
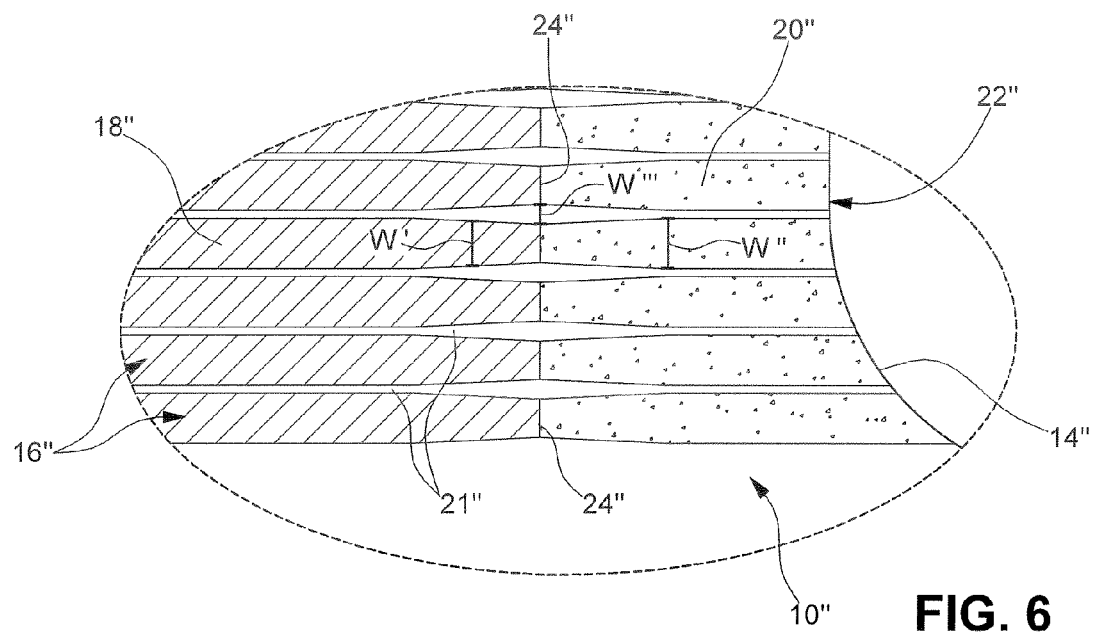
FIG. 6 is an enlarged fragmentary top plan view of an outlet aperture of a fuel cell plate according to another embodiment of the invention.

FIG. 6 shows a fuel cell plate 10" according to an embodiment of the invention similar to the fuel cell plate 10 of FIG. 2 except as described below. Like structure from FIG. 2, in FIG. 6 includes the same reference numerals and a double prime symbol ("). The fuel cell plate 10" includes a hydrophilic portion 18" and a hydrophobic portion 20" formed thereon. The hydrophobic portion 20" is adjacent to and in fluid communication with outlet aperture 14".

The hydrophilic portion 18" is a coating formed from a hydrophilic material on the flow channels 16" of an active area of the fuel cell plate 10". The hydrophilic portion 18" is formed adjacent the hydrophobic portions 20". A portion of each of the flow channels 16" of the hydrophilic portion 20" has a width W. A second portion of each of the flow channels 16" of the hydrophilic portion 18" has a width W' less than the width W. The second portions of the flow channels 16" having the width W' are formed adjacent the hydrophobic portion 20". In the embodiment shown, the second portions of the flow channels 16" have a progressively decreasing width W' in the direction of the outlet apertures 14". The width W of the portion of the flow channels 16' of the hydrophilic portion 18" may be uniform or varying, as desired. Also, the second portion of the flow channels 16" may have a uniform width W' greater than the width W, as desired. The hydrophilic material may be a silicon oxide ($SiO_x$), a titanium oxide, another metal oxide, a sol-gel, or other chemical coating, as desired. It is also understood that the hydrophilic portion 18" may extend outside of the active area, as desired.

The hydrophobic portion 20" is typically a coating formed from a hydrophobic material. The hydrophobic portion is formed on the flow channels 16" intermediate the hydrophilic portion 18" and the outlet apertures 14". Each of the flow channels 16" of the hydrophobic portion 20" has at least a portion having a width W" greater than the width W' of the hydrophilic portion 18" of the flow channels 16". In the embodiment shown, the width W" progressively increases in the direction of the outlet aperture 14". The lands 21" formed between the flow channels 16" of the hydrophobic portion 20" have a progressively decreasing width W"' in the direction of the outlet aperture 14". It is understood that the width W" of the flow channels 16" of the hydrophobic portion 20" may be uniform, as desired. The hydrophobic portion 20" extends to an edge 22" of the fuel cell plate 10" adjacent the outlet aperture 14". The hydrophobic portion 20" substantially abuts the hydrophilic portion 18" defining an interface 24" therebetween. The interface 24" may be located at the transition between the regions of converging (or unchanging) and diverging (or unchanging) channel widths, as shown in FIGS. 5 and 6, or in other locations as desired. In the embodiment shown, the interface 24" is rectilinear, however, it is understood that the interface 24" may have a triangular shape, circular shape, linear shape, or other shape, as desired. It is understood that the hydrophobic coating may be a silane, silicon, alkylsilane, a fluoroalkylsilane, a polydimethylsiloxane, polytetrafluoroethylene, or fluorocarbon prepared by a sol-gel, or other chemical coating, as desired. It is also understood that the hydrophobic portion 20" may extend into the active area, as desired, and may be formed by other methods such as a surface treatment, for example.

During operation of a fuel cell assembly, droplets of liquid water are formed in the flow channels 16" of the fuel cell plates 10" on the cathode sides of the fuel cell assembly. Some water also may be transported into the anode flow channels, or may form in the anode channels via condensation resulting from consumption of the hydrogen. It is understood that the operation as described herein for the cathode side is similar to operation for the anode side of the fuel cell assembly. Once the water contacts the hydrophilic portion 18", the water is spread across the hydrophilic portion 18" to militate against water slug formation. The air stream flowing through the cathode side causes water droplets to flow through the flow channels 16" of the active area, toward the outlet manifold of the fuel cell assembly. Water vapor also flows towards the outlet manifold. Water vapor and liquid water in the fuel cell assembly form a gas/liquid interface therebetween. To further facilitate the flow of liquid water and water vapor toward the outlet manifold, a capillary force acts in the direction from a first portion of the hydrophilic portion 18" of the flow channels 16" to a second portion of the hydrophilic portion 18". The liquid water and water vapor flow from the first portion to the second portion because the capillary force tends to flow from a region having a width that produces a gas/liquid interface having a radius of curvature, such as the portion of the flow channels 16", to a region having a narrower width producing a gas/liquid interface having a smaller radius of curvature, such as the second portion of the flow channels 16'.

A capillary force acts in the direction from the manifolds to the flow channels 16" because the capillary force tends to flow from a region having a width that produces a gas/liquid interface having a radius of curvature, such as the manifolds, to a region having a narrower width producing a gas/liquid interface having a smaller radius of curvature, such as the flow channels 16", for example. However, in the presence of the hydrophobic portion 20", once the liquid water and water vapor are forced through the hydrophobic portion 20" and into the outlet manifold, the hydrophobic portion 20" militates against the flow of water from the outlet manifold into the flow channels 16". The hydrophobic portion 20" formed adjacent an inlet manifold also militates against the flow of water therefrom and into the flow channels 16". Because the reactant flow through the inlet manifold typically has a relative humidity less than one-hundred percent, water that has accumulated in the inlet manifold will be evaporated during operation of the fuel cell assembly.

Figure 7:
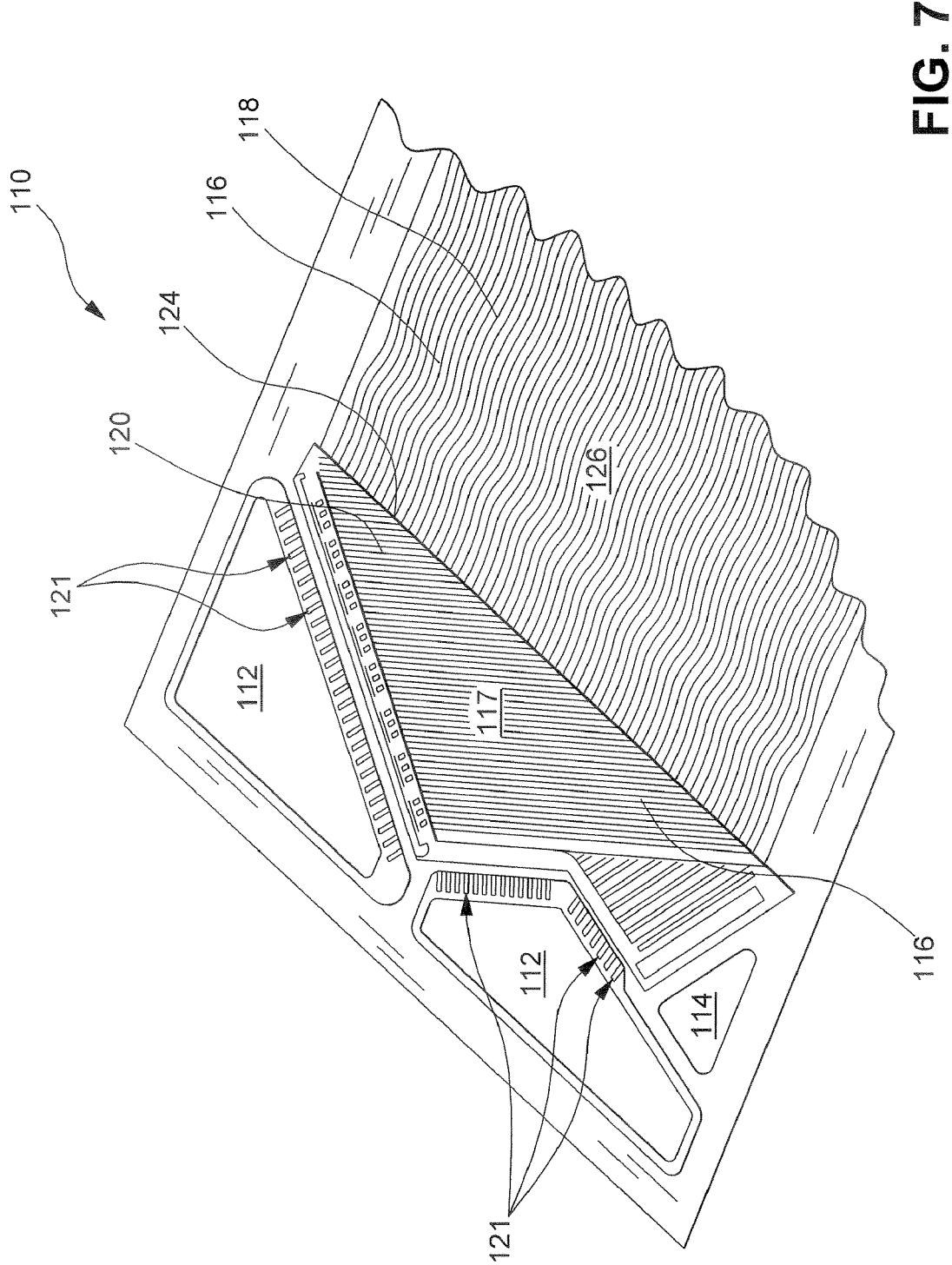
FIG. 7 is a fragmentary top plan view of a fuel cell plate according to another embodiment of the invention.

The configuration of the transitions or interfaces 24 between the hydrophilic portion 18 and the hydrophobic portion or an uncoated portion must account for the specific geometric features of the bipolar plate 10 under consideration. For example, instead of having flow channels 16 which begin and end abruptly at common manifolds, as illustrated in FIGS. 2-6, some bipolar plates have a geometry that provides for reactant flow into and out of the electrochemically active portion of the plates, like the fuel cell plate 110 shown in FIG. 7. The fuel cell plate 110 includes non-electrochemically active regions 117 at an inlet aperture 112 and an outlet aperture 114 to facilitate the flow of reactant gases between the manifolds formed by adjacent apertures 112, 114 to an active fuel cell area 126. In the active area, the anode and cathode reactant streams flow in a predominantly parallel manner, in either a co-flow or a counter-flow. Moreover, the geometrical features of the fuel cell plate 110 may include flow channels (not shown) which allow a flow of gas between the unipolar plates of the fuel cell plate 110. The interface 124 between the hydrophilic portion 118 and the hydrophobic region 120 or an uncoated portion may be aligned with the edge of the active area 126 or at an edge of the inactive area 117, adjacent apertures 112, 114.

Tunnels 121 in fluid communication with the ports facilitate a flow of reactant gas between the inlet aperture 112 and the outlet aperture 114 to the flow channels 116 of the bipolar plate 110. An additional embodiment involves preparing a fuel cell plate 110 substantially covered with a hydrophilic coating thereon. A portion of the tunnels 121 may include a hydrophobic coating or the tunnels 121 may be uncoated, as desired. Alternatively, the entire fuel cell plate 110 may be uncoated with the exception of a portion of the tunnels 121 having a hydrophobic coating.

It is understood that the various configurations of hydrophilic, hydrophobic, and uncoated portions of the fuel cell plates described herein may be applied to either an anode side or a cathode side, or both sides of a fuel cell plate. The coating configuration may be different on the anode side and the cathode side of the bipolar plate. Moreover, the coatings may be applied to the unipolar plates such that upon joining of the unipolar plates, one of more of the coating configurations would be formed on the finished bipolar plate.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell plate comprising:
   a plate having an inlet aperture and an outlet aperture formed therein and a plurality of flow channels formed between and in fluid communication with the inlet aperture and the outlet aperture;
   one of an uncoated portion and a hydrophobic portion formed on the flow channels adjacent the outlet aperture; and
   a hydrophilic portion formed on the flow channels adjacent said one of the hydrophobic portion and the uncoated portion and forming an interface therebetween, wherein a maximum width of each of the flow channels of said one of the hydrophobic portion and the uncoated portion is greater than a maximum width of each of the flow channels of said hydrophilic portion at the interface, said hydrophilic portion and said one of the hydrophobic portion and the uncoated portion facilitating a transport of water from the flow channels to the outlet aperture.

2. The fuel cell plate of claim 1, wherein the interface is one of a triangular shape, a circular shape, a linear shape, and a curvilinear shape.

3. The fuel cell plate of claim 1, further including an inactive area disposed intermediate the apertures and said hydrophilic portion, wherein said one of the hydrophobic portion and the uncoated portion is formed on said inactive area.

4. The fuel cell plate of claim 1, wherein said hydrophilic portion is a coating selected from one of a metal oxide and a mixture of metal oxides.

5. The fuel cell plate of claim 1, wherein said hydrophobic portion is one of a silane, a silicone, an alkylsilane, a fluoroalkylsilane, a polydimethylsiloxane, a polytetrafluoroethylene, and a fluorocarbon.

6. The fuel cell plate of claim 1, further comprising a hydrophobic portion formed on the flow channels adjacent the inlet aperture.

7. The fuel cell plate of claim 1, wherein said plate is a bipolar plate having a cathode side and an anode side.

8. The fuel cell plate of claim 7, wherein said hydrophilic portion and said one of the hydrophobic portion and the uncoated portion are formed on one of the cathode side, the anode side, and both the anode side and the cathode side.

9. The fuel cell plate of claim 1, wherein said hydrophilic portion and said hydrophobic portion overlap.

10. The fuel cell plate of claim 1, wherein said one of the uncoated portion and the hydrophobic portion is a hydrophobic portion, and an uncoated portion is formed between said hydrophilic portion and said hydrophobic portion.

11. The fuel cell plate of claim 1, further comprising a plurality of tunnels formed in said plate and providing fluid communication between the flow channels and at least one of the inlet aperture and the outlet aperture.

12. The fuel cell plate of claim 11, wherein a portion of the plurality of tunnels include a hydrophobic coating.

13. The fuel cell plate of claim 1, wherein said one of the uncoated portion and the hydrophobic portion is a hydrophobic portion, and each of said hydrophilic portion and said hydrophobic portion is formed on the flow channels with at least one of a spraying process, a dipping process, a brushing process, a chemical vapor deposition process, plasma enhanced chemical vapor deposition (PECVD), with a sol-gel by plasma polymerization using atmospheric air plasma process, and on a bulk supply of metal sheet prior to the stamping of said plate.

14. A fuel cell plate comprising:
   a plate having an inlet aperture and an outlet aperture formed therein and a plurality of flow channels formed between and in fluid communication with the inlet aperture and the outlet aperture;
   one of an uncoated portion and a hydrophobic portion formed on the flow channels adjacent the outlet aperture; and
   a hydrophilic portion formed on the flow channels adjacent said one of the hydrophobic portion and the uncoated portion and forming an interface therebetween, wherein a maximum width of each of the flow channels of said one of the hydrophobic portion and the uncoated portion is greater than a width of each of the flow channels of said hydrophilic portion at the interface, said hydrophilic portion and said one of the hydrophobic portion and the uncoated portion facilitating a transport of water from the flow channels to the outlet aperture,
   wherein the width of each of the flow channels of said hydrophilic portion adjacent the interface between said hydrophilic portion and said one of the hydrophobic portion and the uncoated portion is less than the width of each of the flow channels of a remaining portion of said hydrophilic portion.

15. A fuel cell plate comprising:
   a plate having an inlet aperture and an outlet aperture formed therein and a plurality of flow channels formed between and in fluid communication with the inlet aperture and the outlet aperture;
   a plurality of tunnels formed in said plate and providing fluid communication between the flow channels and at least one of the inlet aperture and the outlet aperture; and
   a coating formed on one of a portion of the plurality of tunnels and the flow channels, wherein a maximum width of each of the flow channels adjacent the plurality of tunnels is greater than a maximum width of the remaining portion of each of the flow channels at an interface between the flow channels adjacent the plurality of tunnels and the remaining portion of the flow channels.

16. The fuel cell plate of claim 15, wherein said coating is one of a hydrophilic coating formed on the channels and a hydrophobic coating formed on the portion of the plurality of tunnels.

17. The fuel cell plate of claim 16, wherein said coating is formed with at least one of a spraying process, a dipping process, a brushing process, a chemical vapor deposition process, plasma enhanced chemical vapor deposition (PECVD), with a sol-gel by plasma polymerization using atmospheric air plasma process, and on a bulk supply of metal sheet prior to the stamping of said plate.

18. The fuel cell plate of claim 16, wherein said hydrophobic coating is one of a silane, a silicone, an alkylsilane, a fluoroalkylsilane, a polydimethylsiloxane, a polytetrafluoroethylene, and a fluorocarbon formed with at least one of a spraying process, a dipping process, a brushing process, a chemical vapor deposition process, plasma enhanced chemical vapor deposition (PECVD), with a sol-gel by plasma polymerization using atmospheric air plasma process, and on a bulk supply of metal sheet prior to the stamping of said plate.

19. The fuel cell plate of claim 15, wherein said plate is a bipolar plate having a cathode side and an anode side.

20. A fuel cell stack comprising:
   a plurality of fuel cell plates, each of said plates having an inlet aperture and an outlet aperture formed therein and a plurality of flow channels formed between and in fluid communication with the inlet aperture and the outlet aperture;
   one of an uncoated portion and a hydrophobic portion formed on the flow channels adjacent at least the outlet aperture and the inlet aperture; and
   a hydrophilic portion formed on the flow channels adjacent said one of the uncoated portion and the hydrophobic portion and forming an interface therebetween, wherein a maximum width of each of the flow channels of one of the uncoated portion and the hydrophobic portion is greater than a maximum width of each of the flow channels of said hydrophilic portion at the interface, said hydrophobic portion and said one of the uncoated portion and the hydrophilic portion facilitating a transport of water from the flow channels to the outlet aperture.

* * * * *